(12) United States Patent
Puskar

(10) Patent No.: US 10,017,326 B1
(45) Date of Patent: Jul. 10, 2018

(54) CONVEYOR WITH INTERMEDIATE DRIVE

(71) Applicant: SPAN TECH LLC, Glasgow, KY (US)

(72) Inventor: Ervin Puskar, Bowling Green, KY (US)

(73) Assignee: SPAN TECH LLC, Glasgow, KY (US)

( * ) Notice: Subject to any disclaimer, the term of this patent is extended or adjusted under 35 U.S.C. 154(b) by 419 days.

(21) Appl. No.: 13/957,859

(22) Filed: Aug. 2, 2013

Related U.S. Application Data

(60) Provisional application No. 61/679,236, filed on Aug. 3, 2012.

(51) Int. Cl.
 *B65G 17/30* (2006.01)
 *B65G 17/38* (2006.01)
 *B65G 23/06* (2006.01)

(52) U.S. Cl.
 CPC .................................. *B65G 17/30* (2013.01)

(58) Field of Classification Search
 None
 See application file for complete search history.

(56) References Cited

U.S. PATENT DOCUMENTS

| | | | | |
|---|---|---|---|---|
| 1,960,719 A | * | 5/1934 | Stibbs | B65G 23/14 198/684 |
| 3,107,778 A | | 10/1963 | Friedrich | |
| 3,708,059 A | | 1/1973 | Ackermann | |
| 3,858,473 A | | 1/1975 | Bystron | |
| 3,877,567 A | | 4/1975 | Sommerfield | |
| 3,934,708 A | | 1/1976 | Kambara | |
| 3,994,390 A | | 11/1976 | Peterson, Jr. et al. | |
| 4,422,544 A | | 12/1983 | Alldredge | |
| 4,574,943 A | | 3/1986 | Green | |
| 4,953,693 A | * | 9/1990 | Draebel | B65G 17/086 198/851 |
| 5,620,084 A | | 4/1997 | Mensch | |
| 5,934,862 A | | 8/1999 | Brown et al. | |
| 6,481,567 B2 | * | 11/2002 | Layne | B65G 23/10 198/834 |
| 6,766,898 B2 | * | 7/2004 | Lessard | B65B 25/16 198/459.8 |
| 6,766,899 B1 | | 7/2004 | Guldenfels | |
| 7,195,115 B2 | * | 3/2007 | DePaso | B65G 43/00 198/502.4 |
| 7,559,421 B1 | | 7/2009 | McDaniel et al. | |
| 7,874,418 B2 | | 1/2011 | Steinstrater et al. | |
| 7,987,973 B2 | | 8/2011 | Broe | |
| 8,002,109 B2 | * | 8/2011 | Rogers | B65G 47/22 198/834 |
| 2008/0142341 A1 | * | 6/2008 | Layne | B65G 17/40 198/813 |
| 2011/0073444 A1 | | 3/2011 | Wunsch | |

\* cited by examiner

*Primary Examiner* — Kavel Singh
(74) *Attorney, Agent, or Firm* — King & Schickli, PLLC

(57) ABSTRACT

An apparatus for conveying objects in a conveying direction includes a conveyor including a chain having at least a forward run supported by generally parallel and aligned supports spaced apart in a direction transverse to the conveying direction. A drive, which may be located between the spaced supports or between side links of the chain, includes a first sprocket for driving the chain in the conveying direction and at least one first retainer located between the supports for retaining the chain in engagement with the sprocket. Related methods are also disclosed.

27 Claims, 11 Drawing Sheets

CONVEYOR WITH INTERMEDIATE DRIVE

This application claims the benefit of U.S. Provisional Patent Application Ser. No. 61/679,236, the disclosure of which is incorporated herein by reference.

TECHNICAL FIELD

This disclosure relates to the conveyor arts and, more particularly, to a conveyor including an intermediate drive.

BACKGROUND

Modular link conveyors are typically driven by a plurality of laterally spaced, gang driven sprockets located at the transition of the conveyor from the forward to the return run. Despite the longstanding success of this popular approach, it is not without limits. For one, the amount of power required to drive a particularly long conveyor from one end can be high, and its transfer in the course of operation can generate excessive wear and stress on the sprocket and links of the conveyor chain. For many modular link conveyors capable of undergoing longitudinal expansion and compression, there is also a tendency of the chain to lag in the middle, especially where the chain is particularly wide or the side links are guided along a guide rail and thus retarded by friction.

Accordingly, there is a need for an improved drive arrangement for modular link conveyors. The drive arrangement should be readily adaptable to many different types of conveyors at minimal cost, and potentially applied in a retrofit situation without extensive effort. The drive arrangement would be adapted to drive a variety of conveyors.

SUMMARY

In one aspect, an apparatus for conveying objects in a conveying direction is provided. The apparatus comprises a conveyor including a chain having at least a forward run supported by generally parallel and aligned supports spaced apart in a direction transverse to the conveying direction. A drive is located between the spaced supports. The drive includes a first sprocket for driving the chain in the conveying direction and at least one first retainer located between the supports for retaining the chain in engagement with the sprocket.

The spaced supports comprise guide rails for engaging side links of the chain, and the first retainer may comprise a pair of opposing projections for engaging the chain. The first sprocket is at least partially positioned between the opposing projections of the retainer. The first retainer includes an opening through which the sprocket projects to engage and drive the chain.

The conveyor includes an endless path having a first transition from the forward run to a return run at one end of the conveyor and a second transition from the return run to the forward run at another end of the conveyor spaced from the one end in the conveying direction. The drive may be located between the ends of the conveyor. The drive may further include a second sprocket and a second retainer for retaining the return run of the chain in engagement with the second sprocket. A gear train may be associated with a single motor for driving the first and second sprockets.

The apparatus may include a housing for housing the first sprocket. A shaft passing into the housing includes a second sprocket for engaging the chain. A motor is also provided for rotating the shaft.

A further aspect of this disclosure pertains to an apparatus for conveying objects in a conveying direction. The apparatus comprises a conveyor including a chain with a plurality of modular links arranged in rows extending transverse to the conveying direction, including outer side links. A drive for driving the chain intermediate the outer side links includes a first retainer for retaining the chain in engagement with a first sprocket for driving the chain.

The chain may include at least one row of links including an intermediate link adapted for engaging the first retainer. The intermediate link may include a depending arm carrying a transverse tab for engaging the first retainer. The chain may include at least three links in a row extending transvers to the conveying direction that each include a depending arm carrying a transverse tab.

A further aspect of this disclosure relates to an apparatus for driving a conveyor chain including adjacent rows of links along a pair of spaced support rails. The apparatus comprises a drive including a first retainer for retaining the conveyor chain in engagement with a first sprocket. The first retainer includes a generally planar surface (e.g., upper or lower) having an opening through which the first sprocket at least partially projects to engage and drive the conveyor chain.

The retainer may include at least one channel for receiving a portion of the conveyor chain. The channel includes a length upstream of the sprocket that is greater than a pitch of the adjacent rows of links or greater than a dimension of the links in the conveying direction. The channel may include a tapered entrance at one or both ends for receiving the portion of the chain.

The drive may include a second retainer for retaining the conveyor in engagement with a second sprocket. The first sprocket may supported by a first shaft, the second sprocket supported by a second shaft, and further including a gear train for driving the first and second shafts from a single motor. The first and second sprockets are spaced apart in a conveying direction, and may have axes of rotation that are offset in a vertical direction.

Still a further aspect of this disclosure relates to an apparatus for driving a conveyor chain in a conveying direction. The chain includes adjacent rows of links along a pair of spaced support rails for supporting the conveyor chain along a forward run and a return run. The chain comprises a drive including a first retainer for retaining the conveyor chain in engagement with a first sprocket for driving the chain along the forward run, and a second retainer for retaining the conveyor chain in engagement with a second sprocket for driving the conveyor chain along the return run.

The first and second sprockets may be spaced apart in the conveying direction or spaced apart in a vertical direction. A gear assembly may be provided for driving the first and second sprockets using a single motor.

DETAILED DESCRIPTION

Reference is now made to FIGS. 1-4, which depict one embodiment of a conveyor system 10. In this embodiment, the system 10 includes a belt or chain 11 adapted for supporting and conveying objects. The belt or chain 11 may be comprised of a plurality of interconnected modular links 12.

Figure 1:
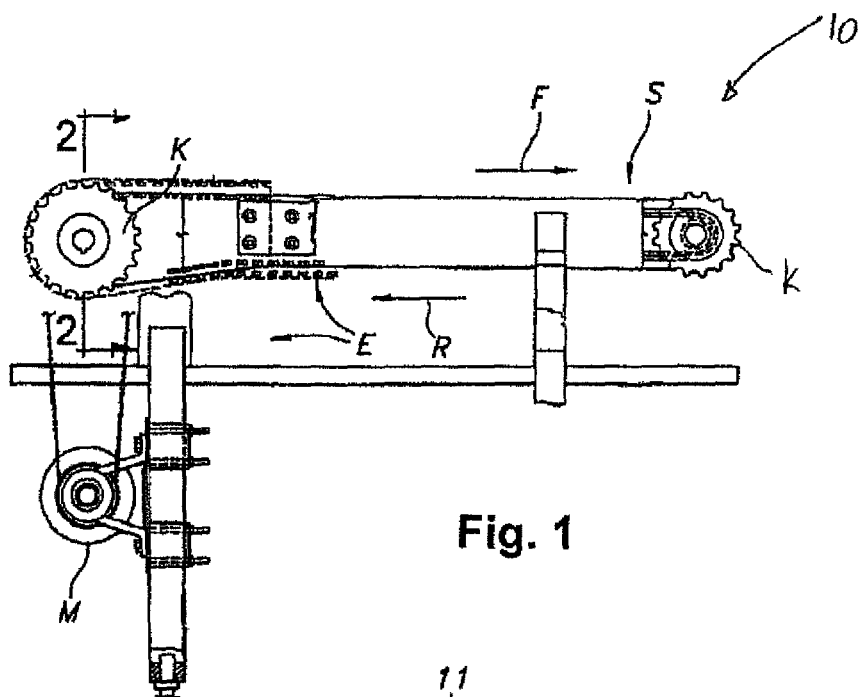
FIG. 1 is a partially schematic, partially cutaway side view of a conveyor system.
Figure 2:
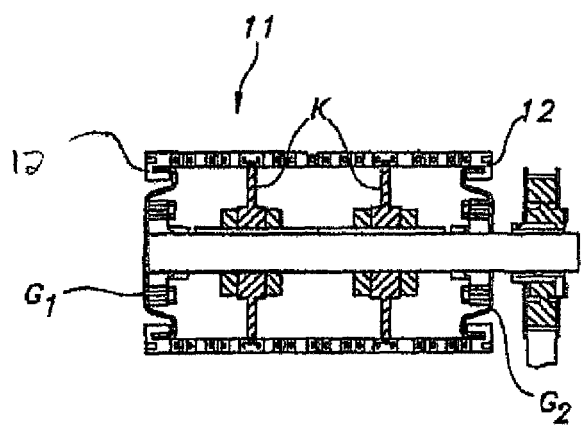
FIG. 2 is a cross-sectional view of the conveyor system.
Figure 3:
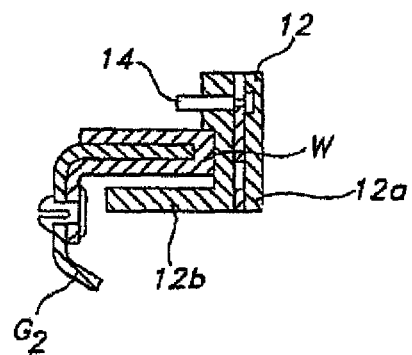
FIG. 3 is a partially cutaway cross-sectional view of the side link arrangement.
Figure 4:
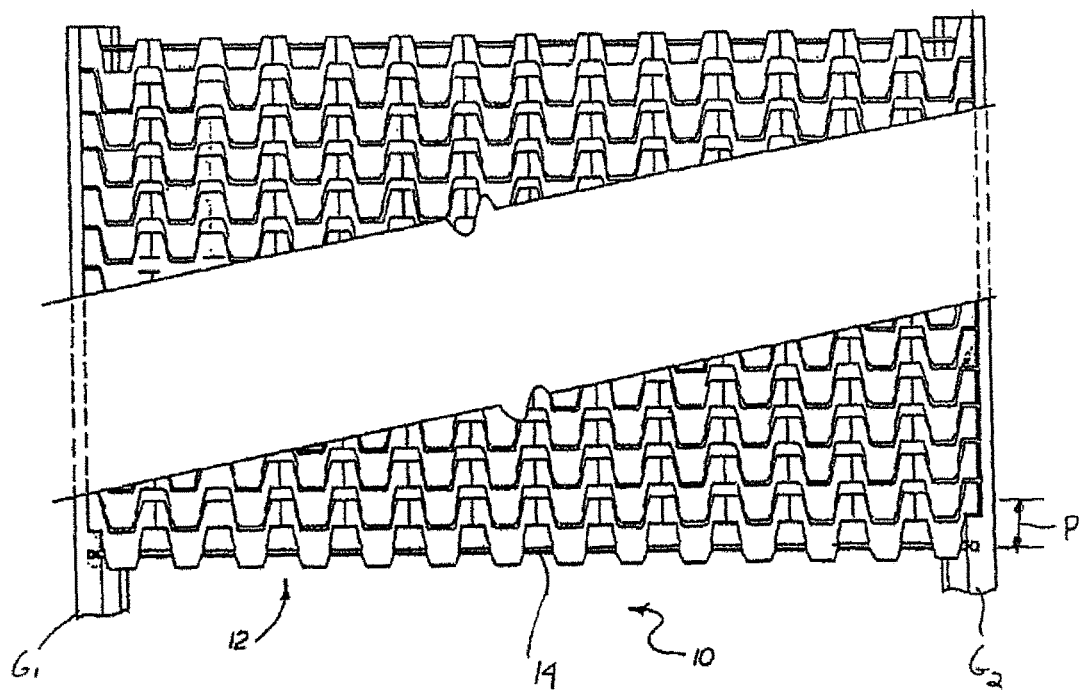
FIG. 4 is a top plan view of the conveyor chain formed of rows of modular links.
Figure 5:
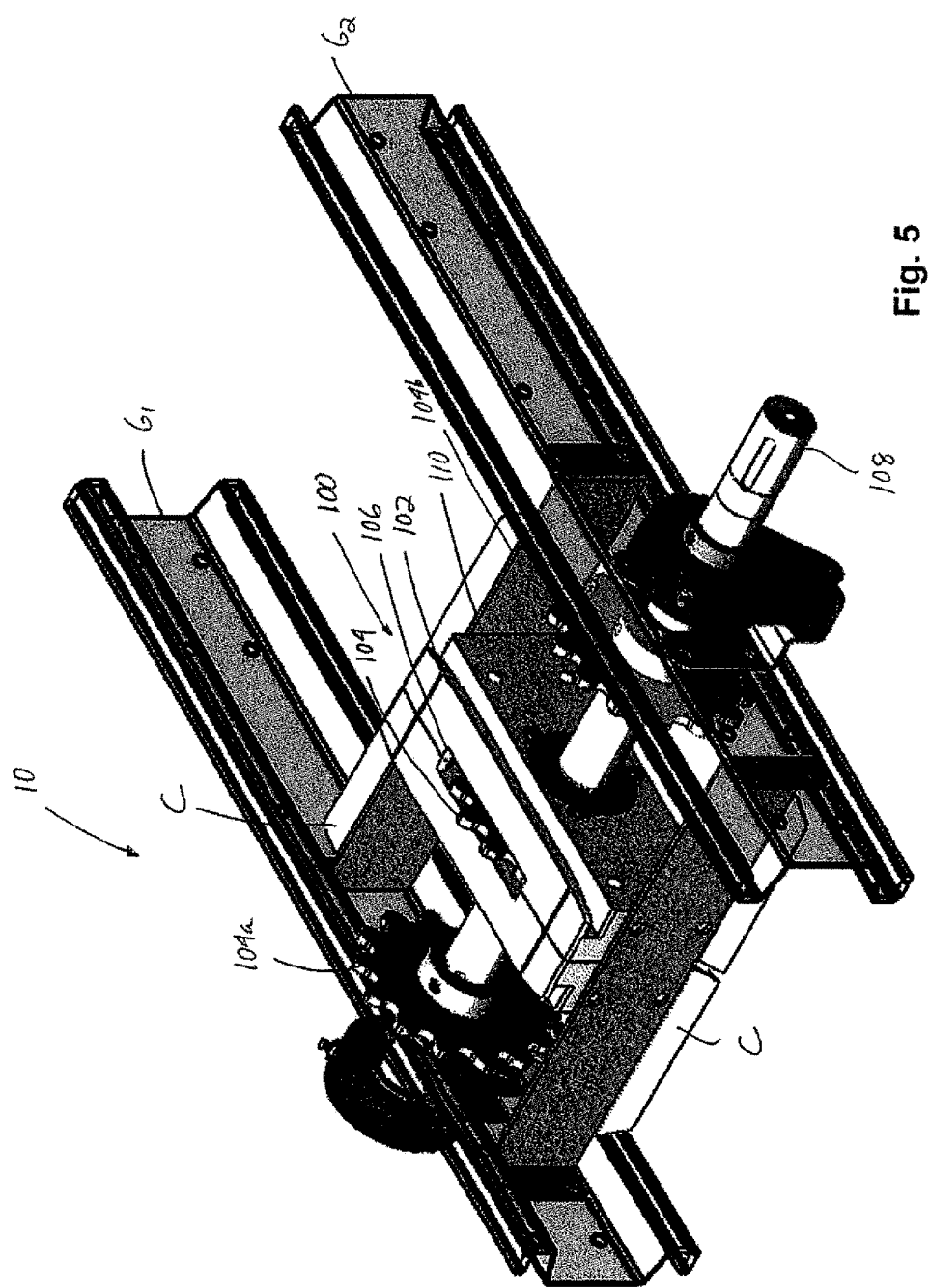
FIG. 5 is a perspective view illustrating one embodiment of the drive.
Figure 6:
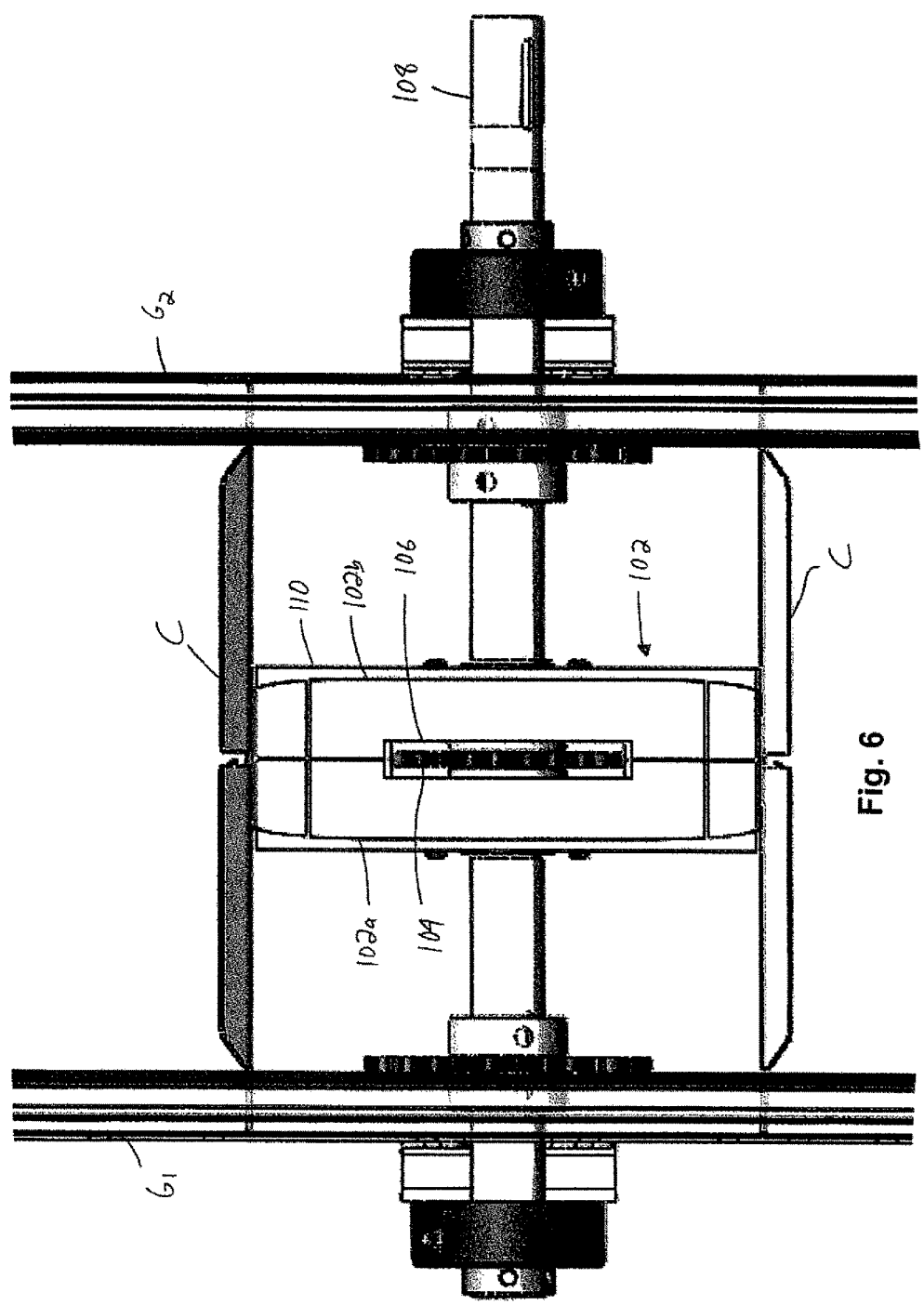
FIG. 6 is a top view illustrating the drive of FIG. 5.

In one embodiment, the links 12 forming the chain 11 are arranged in rows so as to define a pitch P between adjacent rows (that is, the spacing from a location on a link of a first row to a point on a corresponding location on a link of a second row). Each row may include intermediate links sandwiched between specialized side links, which may be adapted to provide a guiding and hold-down function for the chain 12 along spaced guide rails G1, G2 supported by a frame E (such as by including a depending arm 12a and an inwardly projecting guide tab 12b). As shown in FIG. 3, each guide rail G1 or G2 may optionally include a wear strip W to reduce friction and enhance durability.

Adjacent rows of links 12 are connected by transverse connectors 14, which are typically stainless steel rods mounted through matching apertures (e.g., slots and holes) in the adjacent rows and retained by locking tabs. A more detailed description of various examples of such a modular link chain arrangement may be found in U.S. Pat. Nos. 4,953,693 and 5,031,757, the disclosures of which are incorporated herein by reference. However, the present drive arrangement is not limited to any particular type of modular link chain or conveyor system.

In this particular application, the chain 11 is shown as being arranged to travel in an endless conveying path with a conveying surface S for supporting objects (not shown) along a forward run F. In the illustrated embodiment, the conveyor chain 11 is guided between the forward run F and a return run R by end sprockets K mounted along and supported by a rotatable support shaft. The sprockets K are shown as being driven at one end by a motor M, which may be supported by the frame E. However, it is within the broadest aspects of the disclosure for the chain 11 to be driven in a continuous loop in a single (e.g., horizontal) plane, in which case the sprockets could be located anywhere along the path of conveyor travel.

Turning to FIGS. 5-8, it can be understood that the conveyor system 10 may include an intermediate drive 100 for driving the chain 11 along the endless path, which in the illustrated embodiment thus serves as an auxiliary drive. This intermediate drive 100 may comprise a retainer 102 adapted for retaining the chain 11, as well as a sprocket 104 arranged for contacting and driving the chain during the time when it is retained by the retainer 102. This function may be achieved by providing an aperture, such as a slot 106, along the corresponding surface of the retainer 102 through which the teeth of the sprocket 104 partially project. The sprocket 104 is in turn supported by a rotatable shaft 108 driven by a motor (not shown), which may also pass through a housing 110 connected to and providing full and stable support for the guide 102. The shaft 108 may also be journaled in various bearings, as shown.

Figure 9:
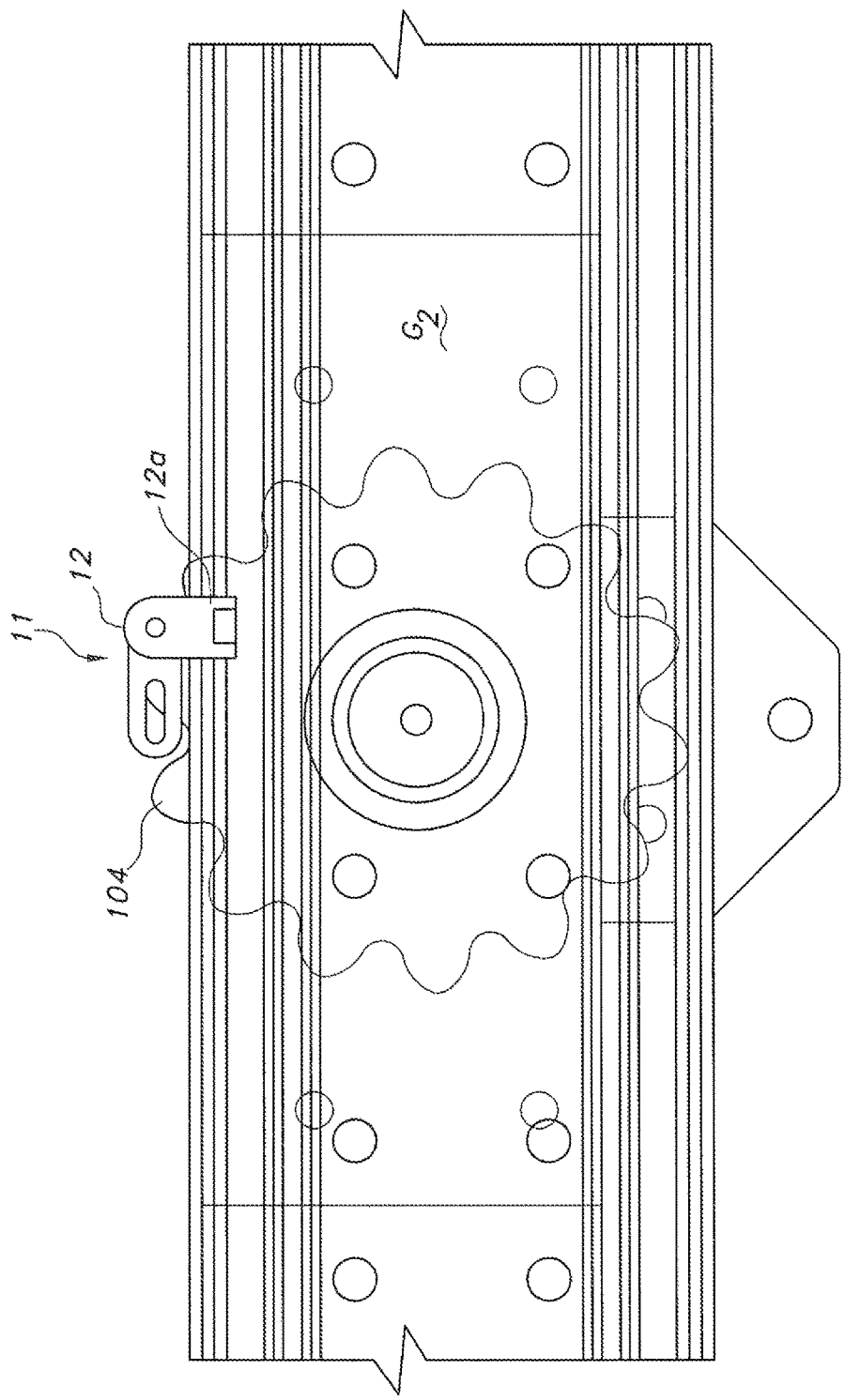
FIG. 9 is a schematic view showing the engagement of the sprocket with a retained link of the chain.

The retainer 102 is adapted for engaging and guiding the chain 11 as it transitions over the sprocket 104. This may be accomplished by forming the retainer 102 with opposing projections 102a, 102b for engaging one or more links 12 of the chain 11, and also forming an upper, generally planar surface for supporting the underside of the links 12 (that is, the side opposite the conveying surface C) as the chain traverses the retainer 102. Specifically, and with reference to FIGS. 8 and 9, the projections 102a, 102b are arranged to form elongated channels 102c sized for receiving a portion of the passing link, such as the inwardly projecting tab 12b. As a result, a hold down function is provided as an intermediate link 12 of the chain 11 engages the sprocket 104 of the drive 100 (such as by engaging a roller 13 associated with this link). It should be appreciated that, in FIG. 8, only a single intermediate link 12 is shown, which would normally be sandwiched between other links, including the specialized side links that serve to engage the guide rails G1, G2 along the lateral sides of chain 11.

Figure 7:
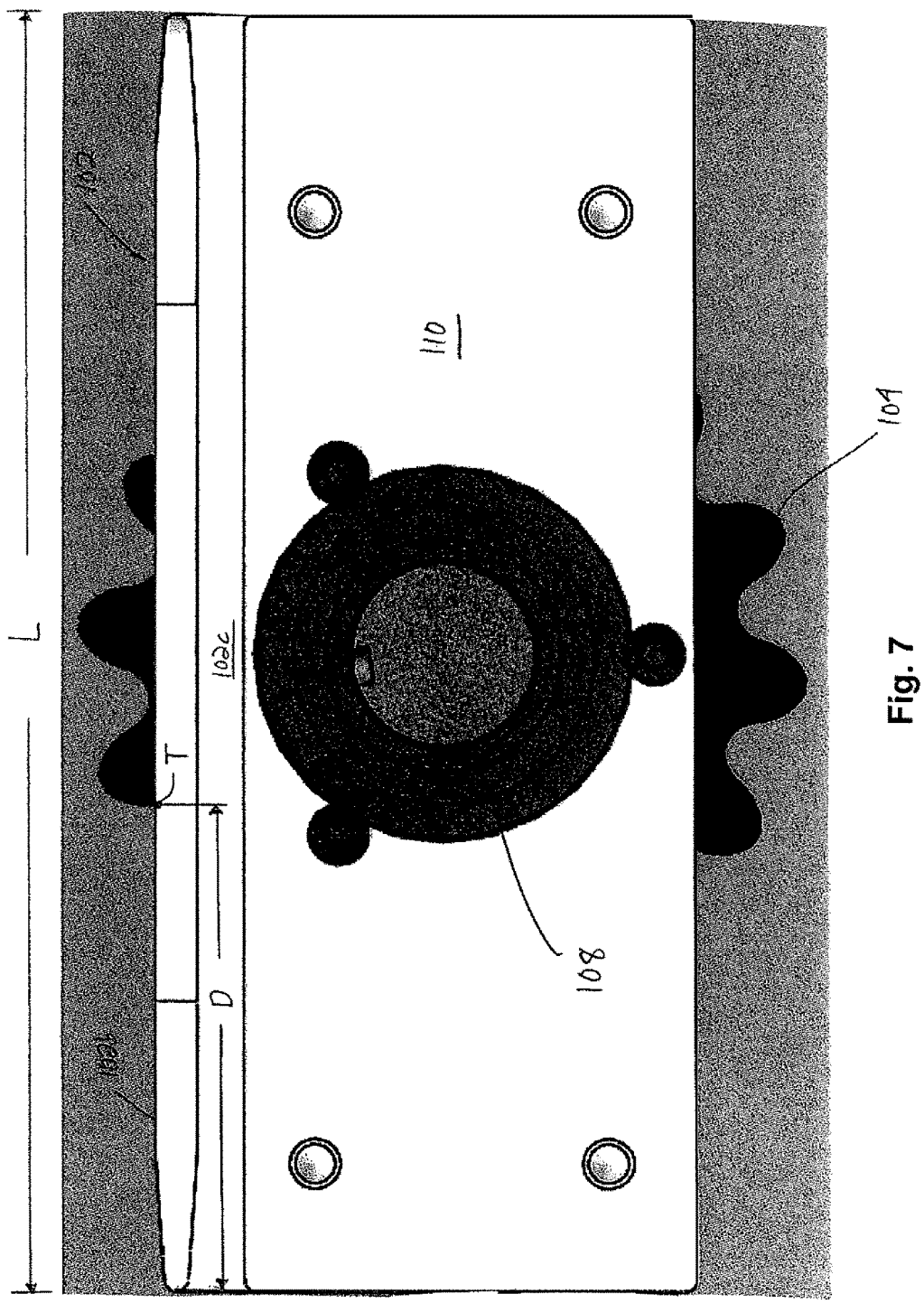
FIG. 7 is a side view of the drive of FIG. 5.
Figure 8:
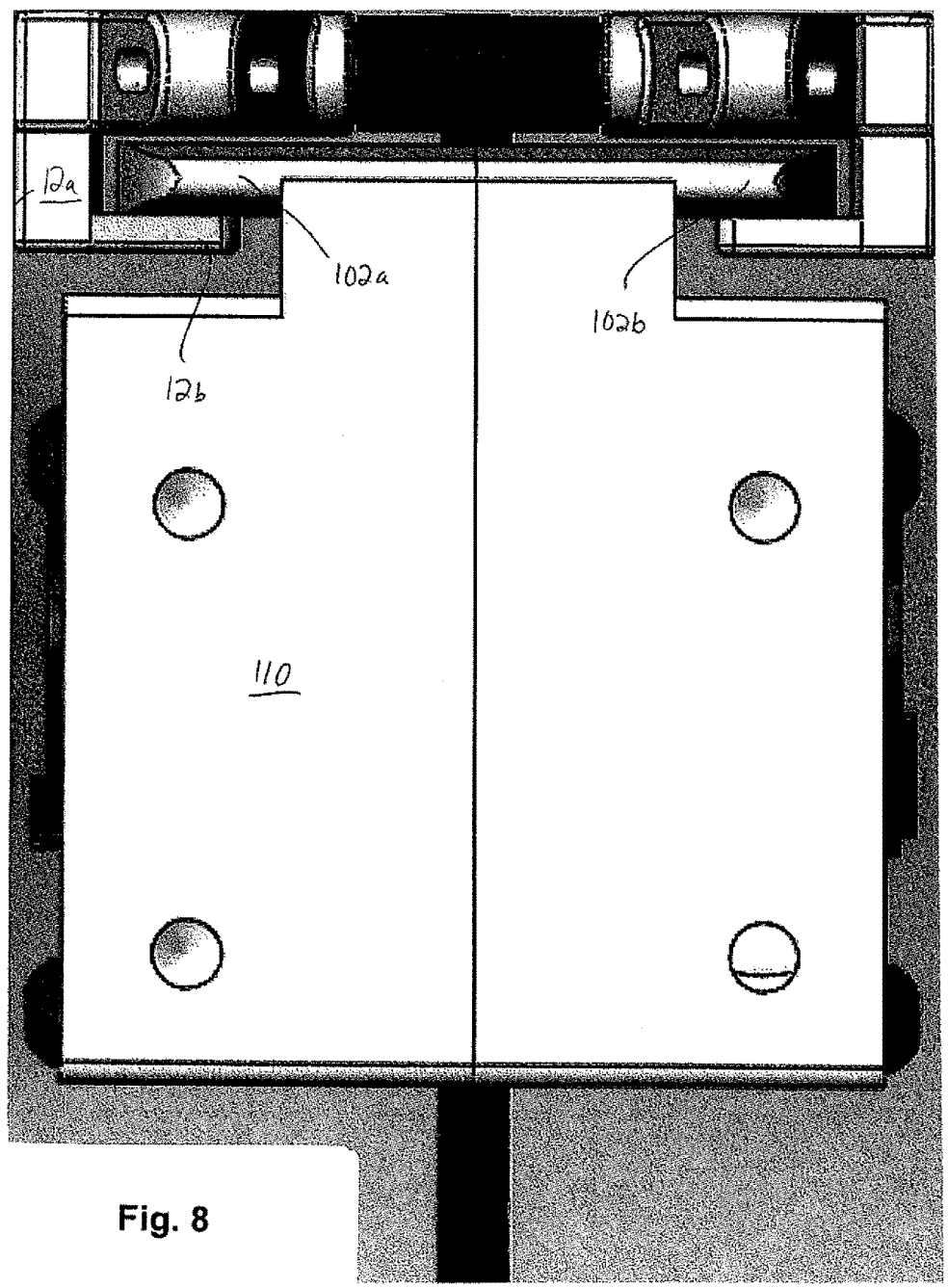
FIG. 8 is an end view of the drive of FIG. 5.

Turning to FIG. 7, it can be understood that the channel 102c has a length L in the conveying direction. A midpoint of the channel 102c may generally coincide with the apex of the sprocket 104. A distance D from the entrance of the channel 102c to the point T at which the sprocket is positioned for engaging the chain 11 should be sufficiently large to ensure that a least any link to be engaged by the sprocket 104 is fully engaged by the retainer 102 at the time of making contact with the sprocket. This may be achieved by making sure that the distance D is equal to or greater than the pitch P of adjacent links (see FIG. 4), or at least greater than a length of a single link in the conveying direction. This ensures that each link 12 is actively held down prior to and up to at the point at which engagement with the sprocket 104 is made, and thus helps to ensure efficient power transfer by reducing the tendency for lifting or tenting.

It is also noted that the entrance of the channel 102c may be oversized relative to a downstream portion to help with receiving the approaching links 12. This may be achieved by tapering the corresponding projection 102b in a vertical direction. The opposite end, or exit, of the channel 102c may also be oversized or tapered in like manner, such as to account for the possibility of bi-directional driving of the chain 12 (in which case, the exit becomes the entrance).

Turning back to FIG. 5, it can also be understood that the shaft 108 may optionally carry auxiliary sprockets 104a, 104b. The positioning of these sprockets 104a, 104b may be closely adjacent to the guide rails G1, G2. This helps to ensure that the desired hold-down function is provided at the point of engagement with the sprockets 104a, 104b.

The drive 100 may be supported by cross members C extending between the guide rails G1, G2 and spaced from each other in the conveying direction. These members C may be secured directly to the housing 110, such as along the end walls thereof. The connections may be made by way of releasable fasteners, such that the cross members C and housing 110 may be easily dismantled for gaining access to sprocket 104 (which may be split to facilitate removal and reattachment from the shaft 108). Although only two are illustrated, more than two guide rails may be provided between the lateral edges of the chain (e.g, between the side links, such as for providing intermediate support).

FIGS. 10-17 relate to a further embodiment of an intermediate drive 200, which includes two retainers 202a, 202b, each associated with a sprocket 204a, 204b. For instance, the first retainer 202a and sprocket 204a may be associated with the upper or forward run of the chain (not shown), while the second retainer 202b and sprocket 204b are associated with the lower or return run. Accordingly, the first sprocket 204a extends upwardly through an aperture, such as a slot 206a, associated with the first retainer 202a, while the second sprocket 204b extends downwardly through an aperture, such as a slot 206b, associated with the second retainer 202b. As should be appreciated, the sprockets 204a, 204b are thus spaced from each other in the conveying direction (that is, the direction of the forward or return runs F, R).

As should be appreciated, each of the sprockets 204a, 204b may be driven by shafts 208a, 208b in the same direction (e.g., clockwise) to move the chain along the endless path. FIGS. 13-16 illustrate a housing 210 for the sprockets 204a, 204b, which may be formed of mating portions 210a, 210b that include the retainers 202a, 202b and associated channels 202c. These portions may include openings for receiving the shafts 208a, 208b and corresponding recesses for receiving the sprockets 204a, 204b. As should be appreciated, these openings and recesses are offset from each other in the vertical direction to provide the desired projection of the sprocket through the corresponding slots 206a, 206b.

Figure 10:
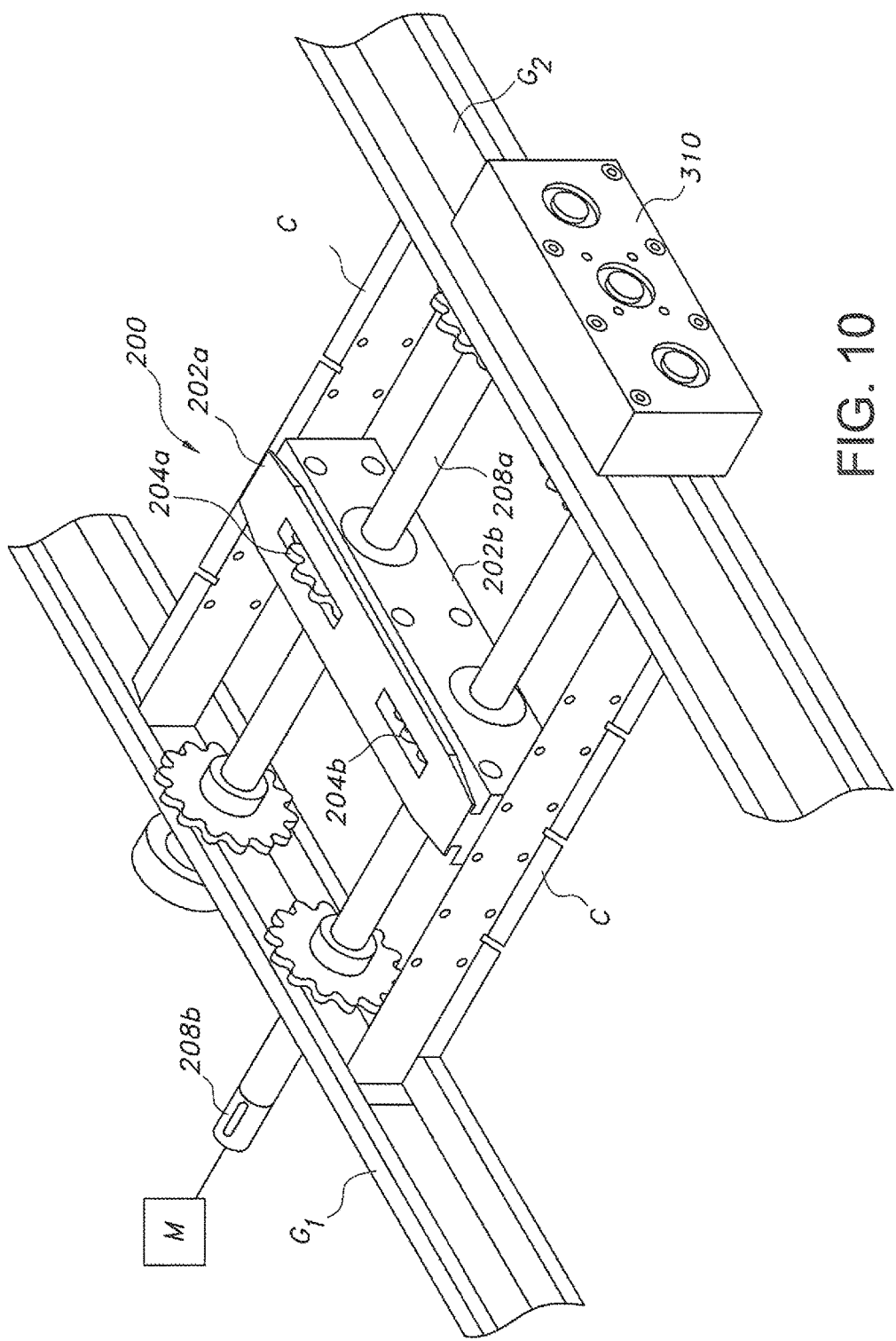
FIG. 10 is a perspective view of an alternate embodiment of the drive.
Figure 12:
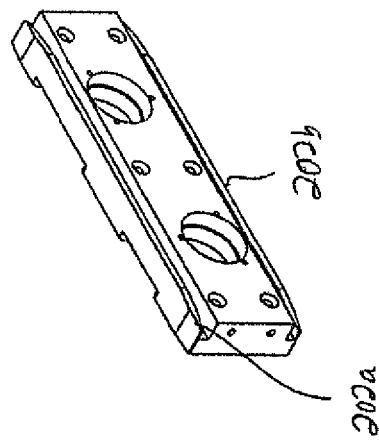
FIGS. 11-17 provide various views of the retainers.
Figure 11:
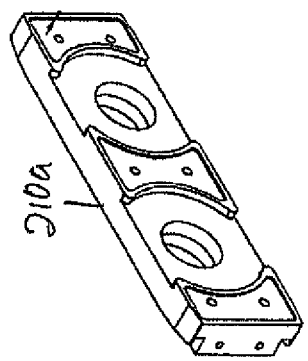
Figure 15:
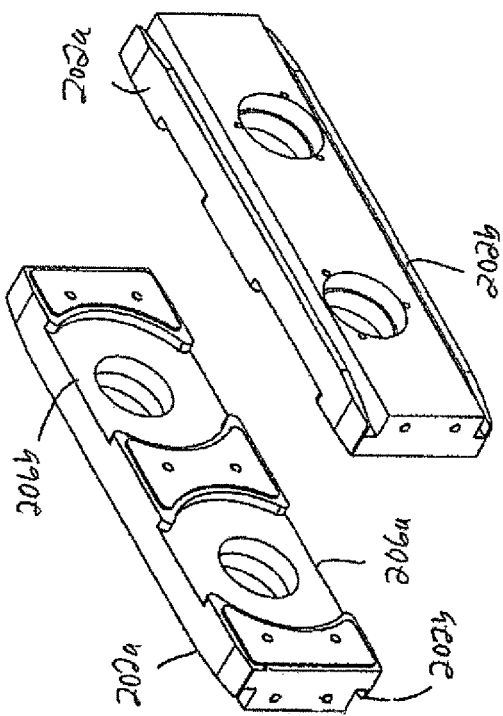
Figure 13:
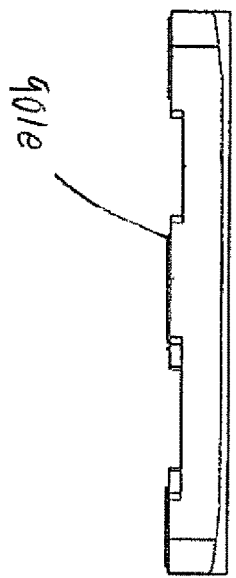
Figure 14:
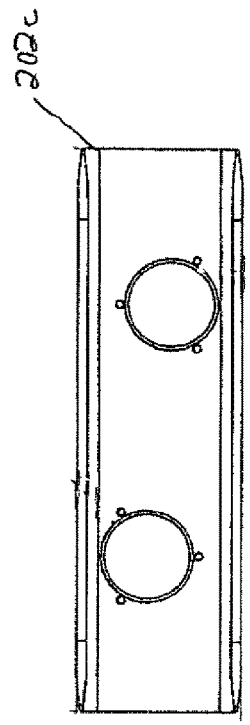
Figure 17:
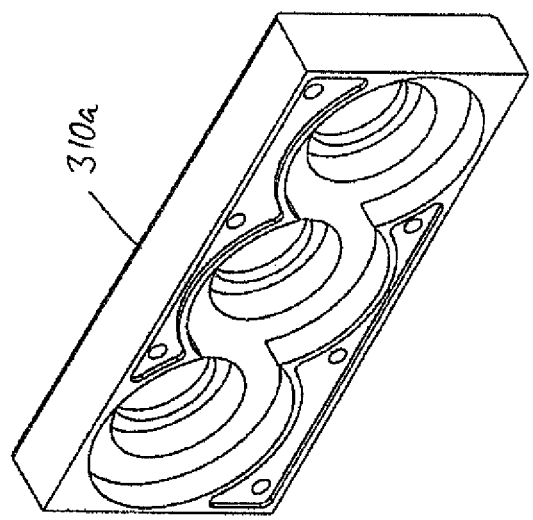
Figure 16:
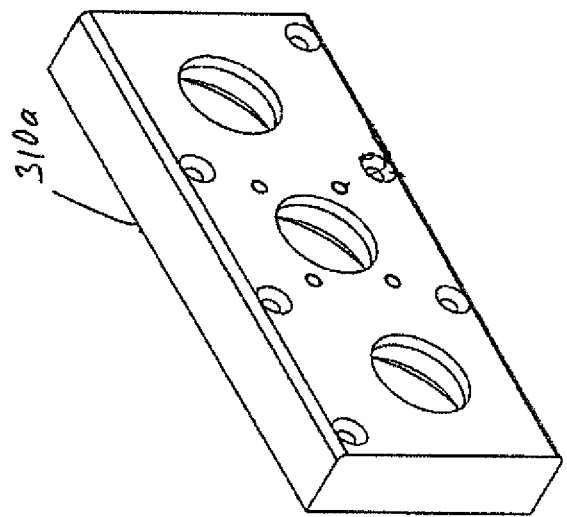

With combined reference to FIGS. 10 and 16, it is also noted that a gear assembly, such as a gear train 300, may be provided for gang-driving the sprockets 204a, 204b from a single motor M. Thus, as shown in FIG. 10, the rotation of the shaft 204b associated with sprocket 204b may rotate a first gear (not shown), which in turn rotates an intermediate gear (not shown), which in turn meshes with a second gear associated with the second shaft 208a for driving sprocket 204a. A housing 310 for the gear train 300 may include mating portions (one portion 310a shown in FIG. 16, with the other portion being substantially a mirror image thereof), which may be secured to and supported by the conveyor, such as by guide rail G2.

The foregoing description of several aspects of the embodiments disclosed herein is presented for purposes of illustration and description. The embodiments described are not intended to be exhaustive or to limit the invention to the precise form disclosed. Modifications or variations are possible in light of the above teachings. For example, any number of sprockets may be provided for engaging the chain 11 in association with the drive 100, 200, including along either run. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention when interpreted in accordance with the breadth to which it is fairly, legally, and equitably entitled.

The invention claimed is:

1. An apparatus for conveying objects in a conveying direction, comprising:
   a conveyor including a chain having at least a forward run contacting generally parallel and aligned supports spaced apart in a direction transverse to the conveying direction; and
   a drive located between the spaced supports, the drive including a first sprocket for driving the chain in the conveying direction and at least one first retainer located between the supports for retaining the chain in engagement with the sprocket;
   wherein the first retainer comprises a pair of transversely opposed projections for engaging the chain, and the first sprocket is at least partially positioned between the opposed projections.

2. The apparatus of claim 1, wherein the spaced supports comprise guide rails for engaging side links of the chain.

3. The apparatus of claim 1, wherein the first retainer includes an opening through which the sprocket projects to engage and drive the chain.

4. The apparatus of claim 1, wherein the conveyor includes an endless path having a first transition from the forward run to a return run at one end of the conveyor and a second transition from the return run to the forward run at another end of the conveyor spaced from the one end in the conveying direction, wherein the drive is located between the ends of the conveyor.

5. The apparatus of claim 4, wherein the drive further includes a second sprocket and a second retainer for retaining the return run of the chain in engagement with the second sprocket.

6. The apparatus of claim 4, further including a gear train associated with a single motor for driving the first and second sprockets.

7. The apparatus of claim 1, further including a housing for housing the first sprocket, a shaft passing into the housing including a second sprocket for engaging the chain, and a motor for rotating the shaft.

8. An apparatus for conveying objects in a conveying direction, comprising:
   a conveyor including a chain with a plurality of modular links arranged in rows extending transverse to the conveying direction, including outer side links; and
   a drive for driving the chain intermediate the outer side links, the drive including a first retainer for retaining the chain in engagement with a first sprocket for driving the chain;
   wherein the first retainer includes an opening through which the first sprocket projects for engaging and driving the chain.

9. The apparatus of claim 8, wherein the chain includes at least one row of links including an intermediate link adapted for engaging the first retainer.

10. The apparatus of claim 9, wherein the intermediate link includes a depending arm carrying a transverse tab for engaging the first retainer.

11. The apparatus of claim 8, wherein the chain includes at least three links in a row extending transverse to the conveying direction that each include a depending arm carrying a transverse tab.

12. An apparatus for driving a conveyor chain including adjacent rows of links along a pair of spaced support rails, comprising:
   a drive including a first retainer for retaining the conveyor chain in engagement with a first sprocket, the first retainer including a generally planar surface having an opening through which the first sprocket at least partially projects to engage and drive the conveyor chain.

13. The apparatus of claim 12, wherein the retainer includes at least one channel for receiving a portion of the conveyor chain.

14. The apparatus of claim 12, wherein the channel includes a length upstream of the sprocket that is greater than a pitch of the adjacent rows of links.

15. The apparatus of claim 12, wherein the channel includes a length upstream of the sprocket that is greater than a width of the links in the conveying direction.

16. The apparatus of claim 12, wherein the channel includes a tapered entrance at one end for receiving the portion of the chain.

17. The apparatus of claim 10, wherein the channel includes a tapered entrance at each end for receiving the portion of the chain.

18. The apparatus of claim 12, wherein the drive includes a second retainer for retaining the conveyor in engagement with a second sprocket.

19. The apparatus of claim 18, wherein the first sprocket is supported by a first shaft, the second sprocket is supported by a second shaft, and further including a gear train for driving the first and second shafts from a single motor.

20. The apparatus of claim 18, wherein the first and second sprockets are spaced apart in a conveying direction.

21. The apparatus of claim 18, wherein the first and second sprockets each have an axis of rotation, and wherein the axes of rotation are offset in a vertical direction.

22. The apparatus of claim 12, wherein the generally planar surface comprises an upper surface of the retainer.

23. The apparatus of claim 12, wherein the generally planar surface comprises a lower surface of the retainer.

24. An apparatus for driving a conveyor chain in a conveying direction, the chain including adjacent rows of links along a pair of spaced support rails for supporting the conveyor chain along a forward run and a return run, comprising:
    a drive including a first retainer for retaining the conveyor chain in engagement with a first sprocket for driving the chain along the forward run, and a second retainer for retaining the conveyor chain in engagement with a second sprocket for driving the conveyor chain along the return run.

25. The apparatus of claim 24, wherein the first and second sprockets are spaced apart in the conveying direction.

26. The apparatus of claim 24, wherein the first and second sprockets are spaced apart in a vertical direction.

27. The apparatus of claim 24, further including a gear assembly for driving the first and second sprockets using a single motor.

* * * * *